US012727594B2

(12) United States Patent
Jones

(10) Patent No.: US 12,727,594 B2
(45) Date of Patent: Sep. 8, 2026

(54) MECHANICAL DEVICE TO SELECTIVELY DEFOLIATE LAWN WEEDS

(71) Applicant: Edward Leslie Jones, Cincinnati, OH (US)

(72) Inventor: Edward Leslie Jones, Cincinnati, OH (US)

( * ) Notice: Subject to any disclaimer, the term of this patent is extended or adjusted under 35 U.S.C. 154(b) by 318 days.

(21) Appl. No.: 18/597,582

(22) Filed: Mar. 6, 2024

(65) Prior Publication Data

US 2025/0040535 A1 Feb. 6, 2025

Related U.S. Application Data

(63) Continuation-in-part of application No. 18/445,366, filed on Aug. 2, 2023, now abandoned.

(51) Int. Cl.

| | |
|---|---|
| ***A01M 21/02*** | (2006.01) |
| ***A01B 45/02*** | (2006.01) |
| ***A01G 20/30*** | (2018.01) |

(52) U.S. Cl.

CPC ........... *A01M 21/02* (2013.01); *A01B 45/026* (2013.01); *A01G 20/30* (2018.02)

(58) Field of Classification Search

CPC ....... A01M 21/02; A01G 20/30; A01B 45/026

See application file for complete search history.

(56) References Cited

U.S. PATENT DOCUMENTS

| | | | | |
|---|---|---|---|---|
| 2,612,094 | A * | 9/1952 | Drozinski | A01B 33/021 172/106 |
| 3,946,543 | A * | 3/1976 | Templeton | A01D 42/02 56/17.6 |
| 9,237,690 | B2 * | 1/2016 | Pavan | A01D 34/42 |
| 10,058,087 | B2 | 8/2018 | Henderson | |
| 2015/0201607 | A1 | 7/2015 | Henderson | |
| 2018/0368315 | A1 * | 12/2018 | Jones | A01D 34/4165 |
| 2019/0216018 | A1 * | 7/2019 | Bassett | A01D 43/14 |
| 2022/0256833 | A1 * | 8/2022 | Brauer | A01B 39/18 |

* cited by examiner

*Primary Examiner* — Brad Harcourt

(57) ABSTRACT

A defoliation device includes a housing, a push handle, at least one set of wheels, a drive system, and at least one spindle assembly. The housing includes a front section, a rear section, a shaft mount, an interior compartment, a lower opening, and a top section. The push handle is coupled to the rear section of the housing. The at least one set of wheels are rotatably coupled to the housing adjacent to the lower opening. The drive system includes a motor and at least one belt. The at least one spindle assembly includes a shaft and a plurality of trimmer line sets. The at least one spindle assembly positioned within the interior compartment of the housing. The shaft traverses the housing and is operatively engaged to the drive system by way of the at least one belt and to the shaft mount.

13 Claims, 15 Drawing Sheets

MECHANICAL DEVICE TO SELECTIVELY DEFOLIATE LAWN WEEDS

CROSS-REFERENCE TO RELATED APPLICATIONS

This application is a continuation in parts of Ser. No. 18/445,366 filed on Aug. 2, 2023.

BACKGROUND

The presence of weeds on a lawn can pose several negative aspects that affect both the aesthetics and health of the lawn. Weeds compete with desirable grass and plants for essential resources such as water, sunlight, and nutrients, thereby compromising the overall health and vigor of the lawn. As weeds grow, they can quickly spread and choke out grass, leading to patchy, unsightly areas that detract from the lawn's appearance. Additionally, certain types of weeds, such as dandelions and crabgrass, have deep root systems that can penetrate the soil and create a dense mat, making it difficult for grass roots to establish and thrive. Weeds also serve as hosts for pests and diseases that can further damage the lawn and surrounding vegetation, increasing the risk of infestation and infection. Moreover, the presence of weeds can diminish the value of the property and detract from the curb appeal of the landscape, making it less inviting and aesthetically pleasing. Overall, the negative aspects of having weeds on a lawn underscore the importance of proactive weed management and maintenance practices to preserve the health and appearance of the landscape.

Using herbicides for weed removal is a common practice in lawn care and agriculture aimed at controlling and managing unwanted plant growth. Herbicides are chemical substances specifically formulated to target and eliminate weeds while minimizing harm to desirable plants. They offer an effective and efficient solution for controlling weeds in various settings, including lawns, gardens, agricultural fields, and non-crop areas.

Herbicides work by disrupting essential physiological processes in weeds, such as photosynthesis, growth regulation, and nutrient uptake, leading to their eventual death. They come in different formulations, including selective herbicides that target specific types of weeds while sparing desirable plants, and non-selective herbicides that kill a broad spectrum of plant species.

The use of herbicides can provide several benefits in weed management, including improved aesthetics, reduced labor requirements, increased crop yields, and enhanced environmental stewardship by minimizing the need for mechanical cultivation and soil disturbance.

However, despite their effectiveness, herbicides also pose several negative aspects and potential risks. One of the primary concerns is the potential for environmental contamination and ecological harm. Herbicides can leach into soil and water bodies, affecting non-target plants, animals, and microorganisms, and disrupting ecosystem balance and biodiversity. Additionally, some herbicides may persist in the environment for extended periods, leading to long-term ecological impacts and concerns about bioaccumulation in the food chain.

Furthermore, the overuse or misuse of herbicides can contribute to the development of herbicide-resistant weed populations, making weed control more challenging and necessitating the use of stronger or more toxic chemicals. Herbicide drift, where spray particles travel beyond the intended target area, can also pose risks to nearby crops, gardens, and natural habitats, causing unintended damage and contamination.

Human health concerns also arise from exposure to herbicides, particularly among applicators, agricultural workers, and individuals living in close proximity to treated areas. Prolonged or excessive exposure to herbicides may increase the risk of adverse health effects, including skin irritation, respiratory issues, neurological disorders, and certain types of cancer.

Mechanical removal of weeds is a traditional method employed in agriculture, landscaping, and lawn care to control unwanted vegetation without the use of chemical herbicides. This approach involves the physical removal of weeds through various mechanical means, such as hand-pulling, hoeing, tilling, mowing, and mechanical weeders. Mechanical removal methods target weeds directly, disrupting their growth and preventing seed dispersal, which helps to manage weed populations and maintain the health and appearance of crops, gardens, and landscapes. Mechanical removal is often favored for its environmental friendliness, as it minimizes the use of synthetic chemicals and reduces the risk of environmental contamination and ecological harm associated with herbicide use.

However, mechanical removal of weeds also comes with several drawbacks and limitations. One of the primary challenges is the labor-intensive nature of mechanical weed control methods, which can be time-consuming and costly, particularly in large-scale agricultural operations. Hand-pulling and manual weeding, while effective for small areas or in organic farming practices, require significant human labor and may not be practical for large fields or commercial operations. Mechanical weeders and equipment, although more efficient than manual methods, often require specialized machinery, skilled operators, and regular maintenance, adding to the overall cost and complexity of weed management.

Moreover, mechanical removal methods may not always be effective in eradicating all types of weeds, especially those with deep root systems or extensive underground rhizomes. Some weeds may regrow from remaining roots or seeds left in the soil after mechanical removal, requiring repeated treatments and additional control measures to prevent reinfestation. Additionally, mechanical disturbance of soil through tillage and cultivation can lead to soil erosion, compaction, loss of organic matter, and disruption of soil microbial communities, which can negatively impact soil health, fertility, and long-term productivity.

Therefore a need exists for a device for removing weeds that improves on the deficiencies of existing mechanical weeds removal systems.

BRIEF SUMMARY

A defoliation device is provided as a device to mechanically remove weeds in a lawn instead of chemical herbicides. The defoliation device utilizes a motor driven horizontal spindle assembly with a large number of closely spaced trimmer lines of equal length are attached turning at high speed to remove vegetation. The vertically rotating strings selectively defoliates any vegetation that has lateral shoots or broad leaves. Turf grasses have narrow leaves and minimal lateral growth and should allow the rotating strings to pass through with little resistance like a comb going through hair while also causing much less damage to the grass leaves. The horizontal spindle may also be as long as desired covering a wide path through the lawn as long as the motor has enough power to handle the workload.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
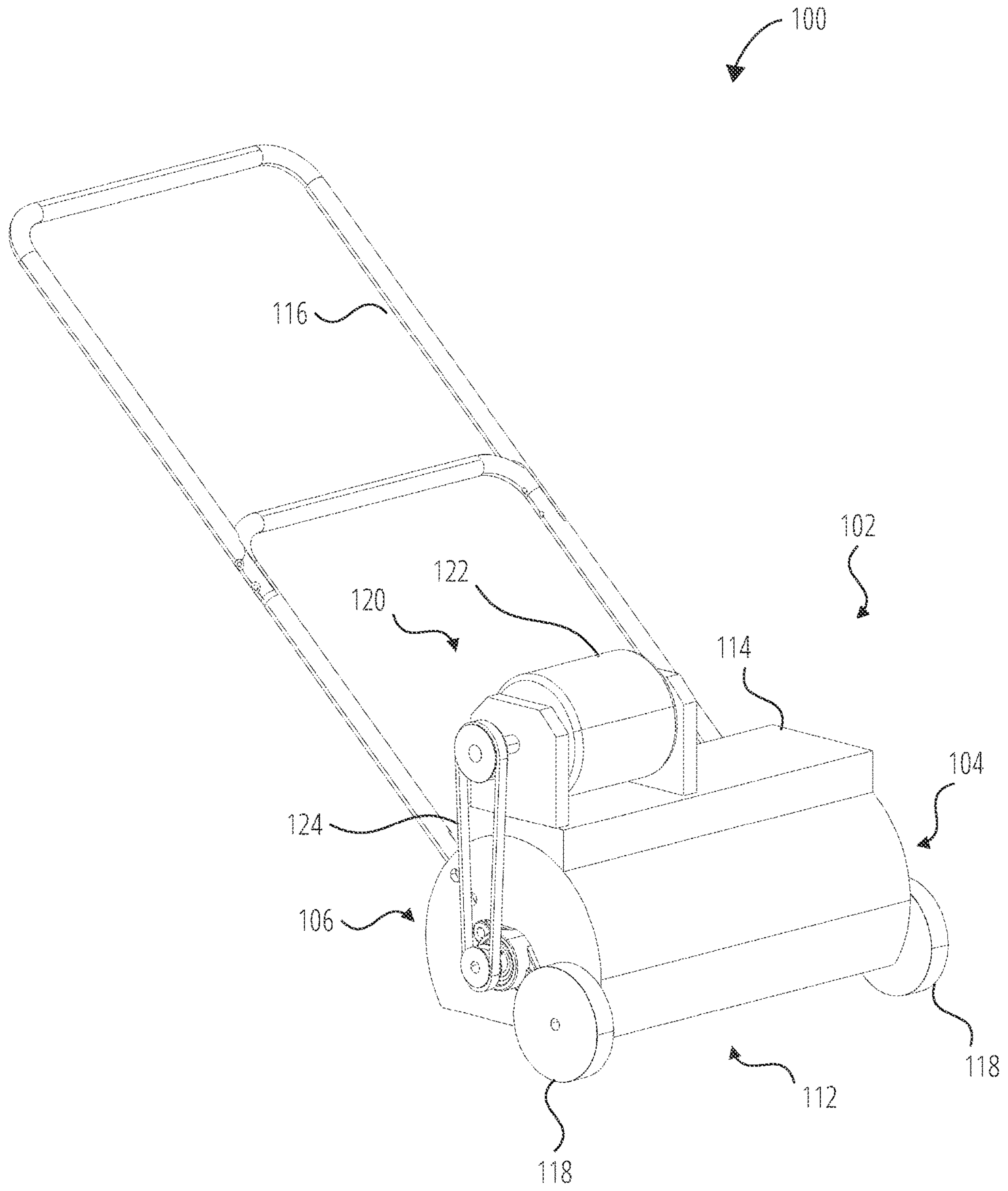
FIG. 1 illustrates an isometric view of defoliation device 100 in accordance with one embodiment.
Figure 2:
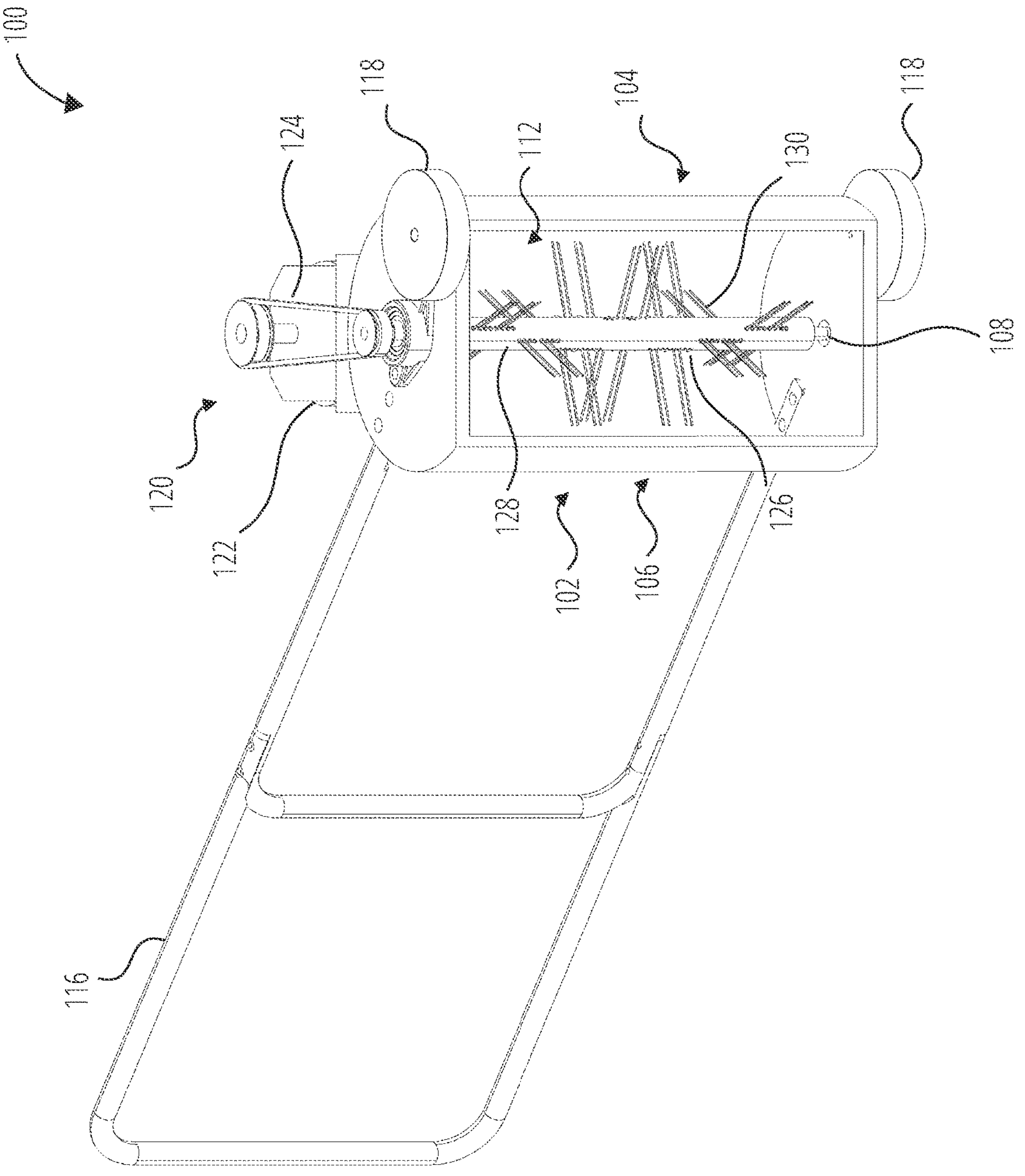
FIG. 2 illustrates an lower isometric view of the defoliation device 100 in accordance with one embodiment.
Figure 3:
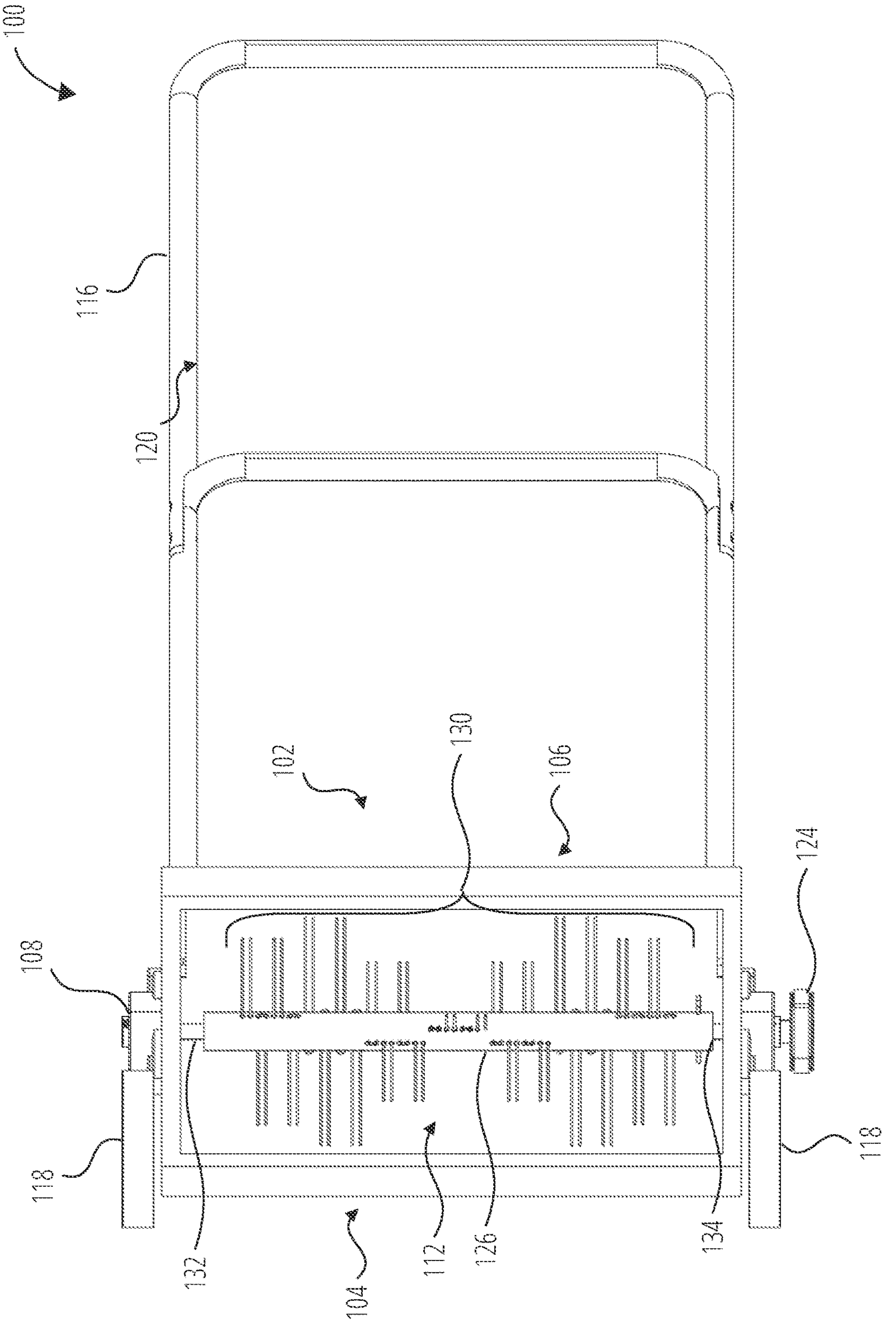
FIG. 3 illustrates a bottom view of the defoliation device 100 in accordance with one embodiment.
Figure 4:
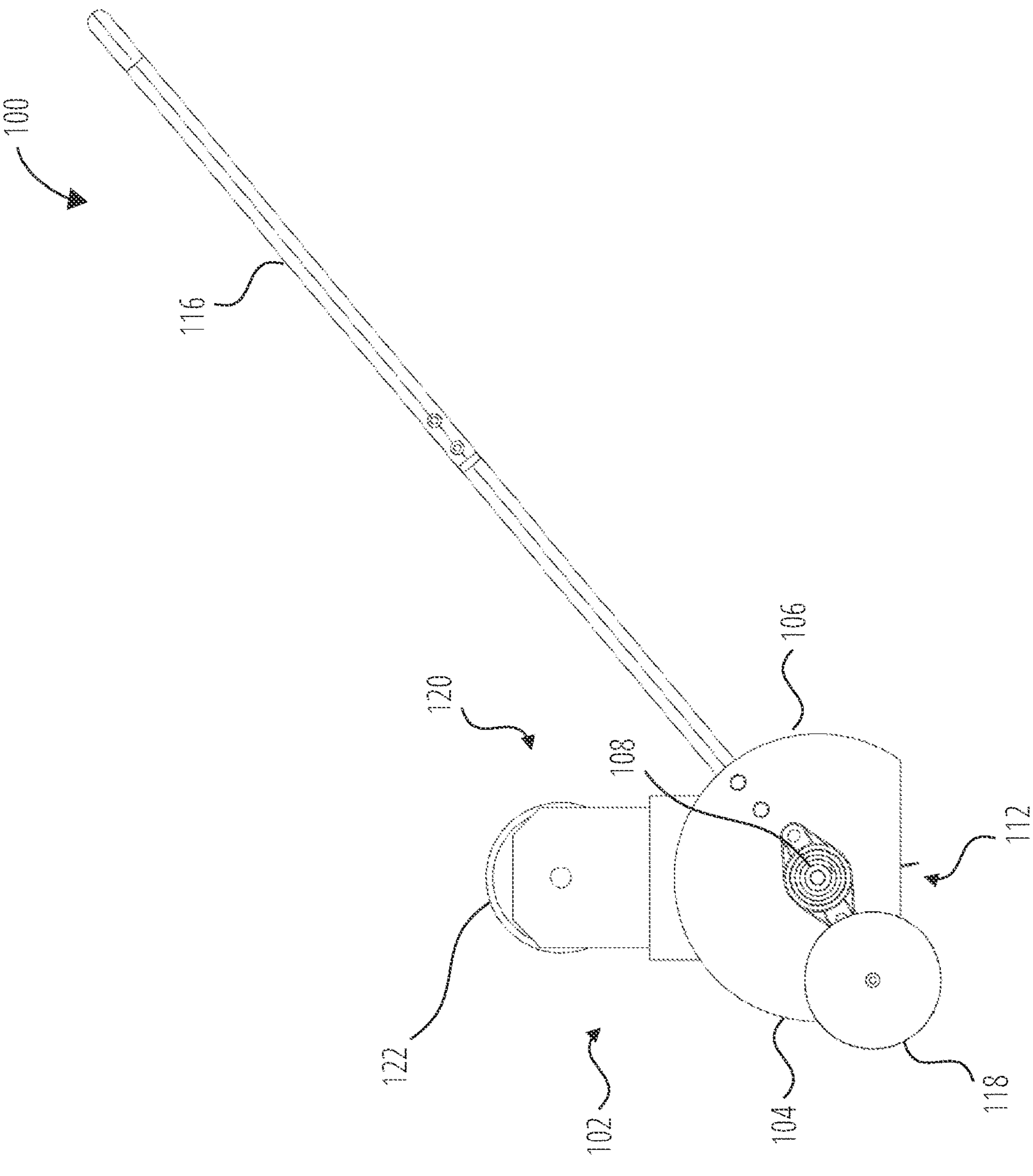
FIG. 4 illustrates a lateral view of the defoliation device 100 in accordance with one embodiment.
Figure 5:
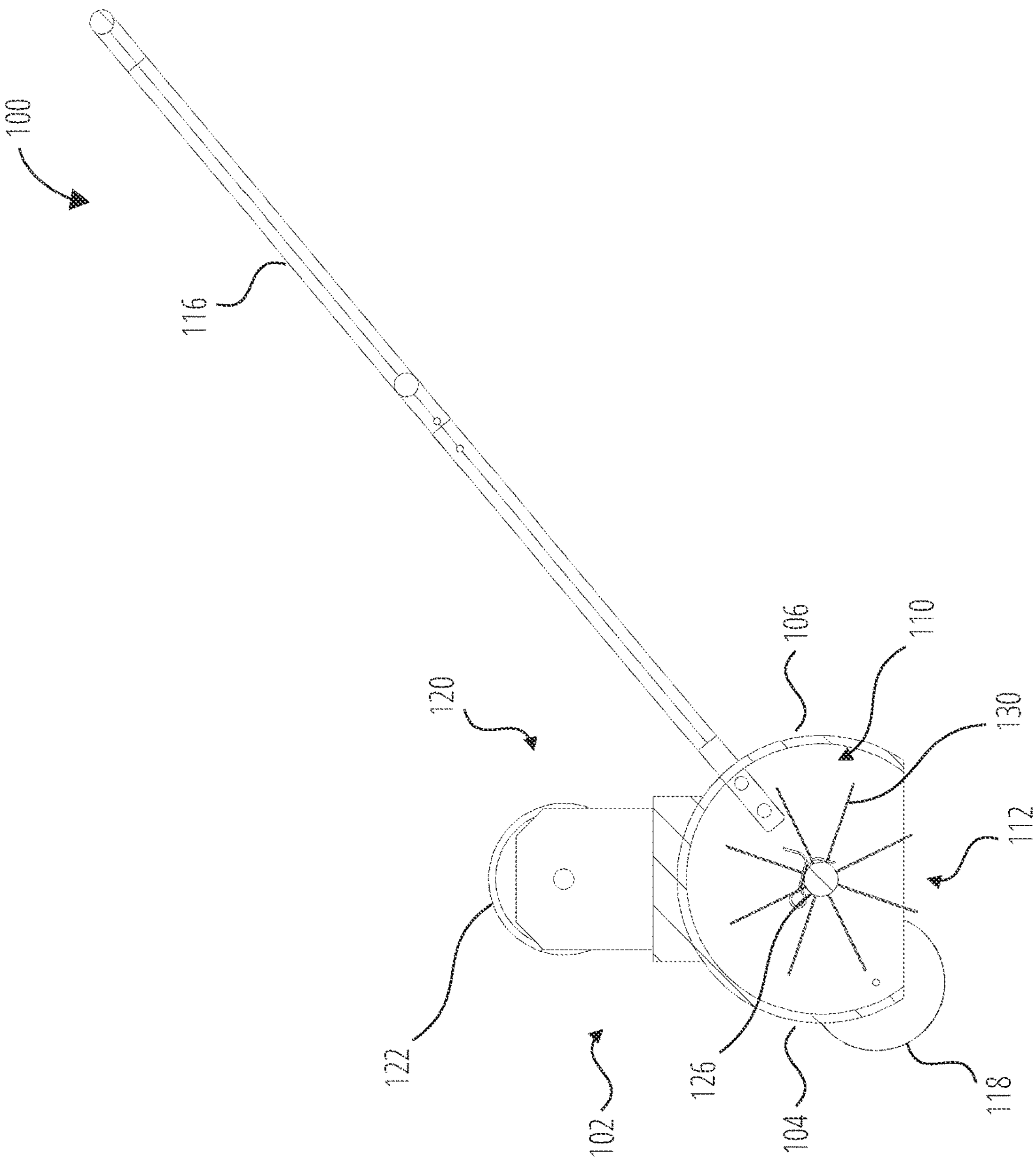
FIG. 5 illustrates a lateral sectional view of the defoliation device 100 in accordance with one embodiment.

In an embodiment, a defoliation device includes a housing, a push handle, at least one set of wheels, a drive system, and at least one spindle assembly. The housing comprising a front section, a rear section, a shaft mount, an interior compartment, a lower opening, and a top section. The push handle coupled to the rear section of the housing and may be configured pushing or pulling the defoliation device. The at least one set of wheels are rotatably coupled to the housing adjacent to the lower opening. The drive system includes a motor and at least one belt, wherein the motor is positioned on the top section of the housing. The at least one spindle assembly comprises a shaft and a plurality of trimmer line sets, wherein the shaft comprises a first shaft end and a second shaft end. The at least one spindle assembly being rotatably positioned within the interior compartment between the front section and the rear section. The first shaft end traverses the housing and is operatively engaged to the drive system by way of the at least one belt. The second shaft end is rotatably coupled to the shaft mount.

In an embodiment, the at least one spindle assembly comprises a first spindle assembly and a second spindle assembly, the drive system comprises a first belt and a second belt. The at least one set of wheels comprises a first set of wheels and a second set of wheels. The first set of wheels are configured such that they are rotatably coupled to the front section near the lower opening and the second set of wheels are configured such that they are rotatably coupled to the rear section near the lower opening. The first spindle assembly and the second spindle assembly is configured such that they are rotatably positioned within the housing between the front section and the rear section. The first spindle assembly are configured such that they are positioned adjacent to the front section and the second spindle assembly are configured such that they are positioned adjacent to the rear section. The first spindle assembly is configured such that they are operatively engaged to the first belt and the second spindle assembly being operatively engaged to the second belt.

In an embodiment, the plurality of trimmer line sets of the first spindle assembly rotates from the lower opening, towards the rear section, and then towards the top section of the housing and where the plurality of trimmer line sets of the second spindle assembly rotate from the lower opening, towards the front section, and then towards the top section. The first spindle assembly being configured such that it is rotatably driven opposite the second spindle assembly, by way of the first belt and the second belt, respectively.

In an embodiment, each trimmer line set of the plurality of trimmer line sets is configured such that it they are radially positioned along the length of the shaft. Each of the trimmer line sets are configure such that they are positioned at a different radial position relative to an adjacent trimmer line set along the shaft.

In an embodiment, each of the trimmer line sets comprises a plurality of looped trimmer lines wherein each looped trimmer line comprises a first line end, a second line end, and a loop. Each of the looped trimmer lines traverses the shaft through a pair of mounting holes. The mounting holes travers the width of the shaft. When mounted, the first line end and the second line end traverse the pair of mounting holes forming a loop opposite the first line end and the second line end across the shaft.

In an embodiment, each of the looped trimmer lines are configured such that they are oriented opposite to an adjacent looped trimmer line, wherein the first line end and the second line end of the looped trimmer line being opposite to the first line end and the second line end of the adjacent looped trimmer line.

In an embodiment, the pair of mounting holes are wider on the shaft adjacent the first line end and the second line end. The width of the mounting holes helps avoid a sharp edge engaging the trimmer line when the defoliation device is in use, preventing additional stress on the trimmer lines that could lead to breaks.

In an embodiment, the at least one belt is enclosed by a shield. The shield may be provided as a secondary enclosure for the moving parts of the drive system that prevent foliage or other objects from interfering with the drive system. The shield may be removable to facilitate cleaning and maintenance of the drive system. The shield may also be configured to as part of the housing such as second housing enclosing the entire drive system not just the at least one belt.

In an embodiment, the motor of the defoliation device may be electrically powered. The electric motor may a brush or brushless electric motor. Brushed DC motors utilize brushes and a commutator to transfer electrical energy to the rotor, generating rotational motion. Brushless DC motors use electronic commutation to control the flow of current, eliminating the need for brushes and reducing maintenance requirements. These motors are known for their quiet operation, precise speed control, and long service life.

Induction motors may also be utilized. Induction motors operate on the principle of electromagnetic induction, where alternating current (AC) is supplied to the stator windings, inducing a rotating magnetic field that drives the rotor. Induction motors are rugged, reliable, and capable of delivering high torque, making them suitable for the defoliation device.

Another option may be to utilize a synchronous reluctance motors, which combine the aspects of induction motors with the efficiency of permanent magnet motors. Synchronous reluctance motors operate without permanent magnets and offer high efficiency, precise control, and reduced energy consumption.

In an embodiment, the plurality of trimmer line sets of the at least one spindle assembly rotates from the lower opening, towards the front section and then towards the top section of the housing.

In one configuration, a defoliation device may include a housing, a push handle, at least one set of wheels, a drive system, and an at least one spindle assembly. The housing includes a front section, a rear section, a shaft mount, an interior compartment, a lower opening, and a top section. The push handle is coupled to the rear section of the housing. The push handle coupled to the rear section of the housing and may be configured pushing or pulling the defoliation device. The at least one set of wheels is configured such that it is rotatably coupled to the housing adjacent to the lower opening. The drive system includes a motor and at least one belt, the motor is positioned on the top section of the housing. The at least one spindle assembly includes a shaft and a plurality of trimmer line sets. The shaft comprises a first shaft end and a second shaft end. The at least one spindle assembly is configured such that it is rotatably positioned within the interior compartment between the front section and the rear section. The first shaft end traverses the housing and is operatively engaged to the drive system by way of the at least one belt. The second shaft end is rotatably coupled to the shaft mount. Each trimmer line set of the plurality of trimmer line sets may be configured to be radially positioned along the length of the shaft, wherein each of the trimmer line sets may be configured such that it is at a different radial position relative to an adjacent trimmer line set along the shaft. Each of the trimmer line sets comprises a plurality of looped trimmer lines wherein each looped trimmer line comprises a first line end, a second line end, and a loop. Each of the looped trimmer lines traverses the shaft through a pair of mounting holes, wherein the first line end and the second line end traverses the pair of mounting holes forming a loop opposite the first line end and the second line end across the shaft. Each of the looped trimmer lines being oriented opposite to an adjacent looped trimmer line, wherein the first line end and the second line end of the looped trimmer line being opposite to the first line end and the second line end of the adjacent looped trimmer line.

In an embodiment, the at least one spindle assembly comprises a first spindle assembly and a second spindle assembly, the drive system comprises a first belt and a second belt, and the at least one set of wheels comprises a first set of wheels and a second set of wheels. The first set of wheels are configured such that they are rotatably coupled to the front section near the lower opening and the second set of wheels are configured such that they are rotatably coupled to the rear section near the lower opening. The first spindle assembly and the second spindle assembly are configured such that they are rotatably positioned within the housing between the front section and the rear section, wherein the first spindle assembly are configured such that they are positioned adjacent to the front section and the second spindle assembly are configured such that they are positioned adjacent to the rear section. The first spindle assembly is configured such that it is operatively engaged to the first belt and the second spindle assembly is configured such that it is operatively engaged to the second belt.

In an embodiment, the first spindle assembly is configured such that it is rotatably driven opposite the second spindle assembly, by way of the first belt and the second belt, respectively.

In an embodiment, the plurality of trimmer line sets of the first spindle assembly rotates from the lower opening, towards the rear section, and then towards the top section of the housing and where the plurality of trimmer line sets of the second spindle assembly rotate from the lower opening, towards the front section, and then towards the top section.

In an embodiment, the pair of mounting holes are wider on the shaft adjacent the first line end and the second line end.

In an embodiment, the at least one belt is enclosed by a shield.

In an embodiment, motor is electrically powered.

In one embodiment, a defoliation device comprises a housing, a push handle, a first set of wheels, a second set of wheels, a drive system, a first spindle assembly, and a second spindle assembly. The housing comprises a front section, a rear section, a shaft mount, an interior compartment, a lower opening, and a top section. The push handle coupled to the rear section of the housing and may be configured pushing or pulling the defoliation device. The first set of wheels may be configured such that they are rotatably coupled to the front section near the lower opening and the second set of wheels may be configured such that they are rotatably coupled to the rear section near the lower opening. The drive system comprises a motor, a first belt, and a second belt, wherein the motor is positioned on the top section of the housing. The first spindle assembly and a second spindle assembly, each comprise a shaft and a plurality of trimmer line sets, wherein the shaft comprises a first shaft end and a second shaft end. The first spindle assembly and the second spindle assembly may be configured such that they are rotatably positioned within the housing between the front section and the rear section, wherein the first spindle assembly may be configured such that it is positioned adjacent to the front section and the second spindle assembly may be configured such that it is positioned adjacent to the rear section. The first shaft end traverses the housing and is operatively engaged to the drive system. The second shaft end is rotatably coupled to the shaft mount. The first spindle assembly may be configured such that it is operatively engaged to the first belt and the second spindle assembly may be configured such that it is operatively engaged to the second belt. Each trimmer line set of the plurality of trimmer line sets may be configured such that they are radially positioned along the length of the shaft, wherein each of the trimmer line sets may be configured such that it is at a different radial position relative to an adjacent trimmer line set along the shaft. Each of the trimmer line sets comprises a plurality of looped trimmer lines wherein each looped trimmer line comprises a first line end, a second line end, and a loop. Each of the looped trimmer lines traverses the shaft through a pair of mounting holes, wherein the first line end and the second line end traverses the pair of mounting holes forming a loop opposite the first line end and the second line end across the shaft. Each of the looped trimmer lines may be configured such that they are oriented opposite to an adjacent looped trimmer line, wherein the first line end and the second line end of the looped trimmer line may be configured such that they are opposite to the first line end and the second line end of the adjacent looped trimmer line. The plurality of trimmer line sets of the first spindle assembly rotates from the lower opening, towards the rear section and then towards the top section of the housing and where the plurality of trimmer line sets of the second spindle assembly rotate from the lower opening, towards the front section, and then towards the top section.

In an embodiment, the defoliation device may be constructed of a plywood top plate that may be 17×8 inches and screwed into two 23×9 inch side plates. Sandwiched between them may be a ⅛ inch thick polyethylene sheet configured as a shield that may be heat formed to match the curve on the side plates. A one horsepower (hp) 1725 rpm electric motor may be mounted on top with a motor mount with its cord leading up a lawn mower handle (push handle) bolted to the side plates with two ⅜ inch bolts at a 140 degree angle. The electric motor should be thermally protected since hot daytime temperatures could possibly overheat the motor. Four 6 inch wheels may be bolted to the sides with ½ inch bolts with washers. The electric motor may be fitted with a 2.55 inch dual pulley to drive a 1.75 inch pulley on each spindle using 3 L V belts giving a 2320 rpm spindle speed. 3 L are more flexible than the standard 4 L V belt and don't need to transmit a lot of power.

Each spindle assembly may be a 1.25 inches OD Delrin rod and have a ½ inch central hole drilled into each end to fit a ½ inch steel shaft. A ⅛ inch hole may be drilled through the spindle and shaft for a cotter pin to lock the shaft. Mounting holes of 0.068 inch diameter may be drilled every ¼ inch all along the spindle to hold the trimmer lines. A 12 inch piece of trimmer line may be cut, folded in two and then fed through two adjacent mounting holes forming a tight loop. This tight loop keeps the trimmer line from being pulled out while the defoliation device is use but can be easily removed and replaced. After every set of four strings the holes are staggered 30 degrees (clocked) and another set of four strings are drilled forming a spiral. This may be so that all the strings on one side don't hit the ground at the same time causing vibration in the V belts. Every other trimmer line pair may be inserted from the opposite side to be sure the spindle assembly may be balanced. It's very important that the exit hole for strings are rounded off or else the sharp edge of the drilled hole will quickly cause the string to break. A 3 mm radius rounding end mill may be utilized to form a rounded exit hole which greatly extends the life of the trimmer lines. A Flanged ½ inch ID ball bearings may be inserted into holes drilled into the side plates to hold the spindle shafts. The shaft ends are kept in place by locking collars or one of the small pulleys in a shaft mount. The spindle assemblies may also be removed by pulling cotter pins and pulling the steel shaft out of the spindle if needed.

The rotation of the spindle assemblies may be configured such that they form a counter rotation within the housing. The first spindle assembly may rotate clockwise so that clippings are not thrown forward and impede the work of the trimmer lines. The first spindle assembly rotating clockwise tends lay the grass down and such that the second spindle assembly may be configured to rotate counter-clockwise to counter this and be more effective and may prevent the clippings from being thrown back towards an operator. The counter-rotating spindles assemblies may be configured to use a V belt such that on the first spindle assembly the belt may be crossed which rotates the first spindle assembly clockwise with the motor turning counter-clockwise. The second spindle assembly may be configured to rotate counter-clockwise with the counter-clockwise motor. Having two spindles may increase the effectiveness and reduce the need for second passes if weeds are missed.

Using the defoliation device may be very much like using a lawn mower. However, stopping the defoliation device in a single location may require a shut off to the motor as running the defoliation device in single spot may eventually begin to damage the grass as well. It may useful to operate the defoliation device after a first pass with a lawn mower the grass so that the trimmer lines can more efficiently remove weeds. A vigorously growing lawn forces the weed leaves higher making them easier to defoliate whereas low lying weed are harder to remove. Making several passes may be not detrimental if needed.

The trimmer lines of the defoliation device are configured to last much longer than the trimmer lines of a weed eater. This may be accomplished by having wider exit holes that are properly rounded for the mounting holes. The trimmer lines may eventually need to be replaced and can be with a pair of pliers. The pliers may grab the end loop to pull the looped trimmer lines out. The replacement may involve folding a 12 inch length of trimmer line in two and pushing it back into the same holes making sure the exit holes are rounded. This may also be accomplished through the use of a cotter pins that can be utilized to pull the shafts to replace the whole string spindle.

FIG. 1-FIG. 6 illustrate a defoliation device 100 in accordance with one embodiment. The defoliation device 100 a housing 102, a push handle 116, an at least one set of wheels 118, a drive system 120, and at least one spindle assembly 126. The housing 102 comprising a front section 104, a rear section 106, a shaft mount 108, an interior compartment 110, a lower opening 112, and a top section 114. The push handle 116 is configured to be coupled to the rear section 106 of the housing 102. The at least one set of wheels 118 is configured to be rotatably coupled to the housing 102 adjacent to the lower opening 112. The drive system 120 comprises a motor 122 and at least one belt 124. The motor 122 is positioned on the top section 114 of the housing 102. The at least one spindle assembly 126 comprises a shaft 128 and a plurality of trimmer line sets 130. The shaft 128 comprises a first shaft end 134 and a second shaft end 132. The at least one spindle assembly 126 is configured to be rotatably positioned within the interior compartment 110 between the front section 104 and the rear section 106. The first shaft end 134 traverses the housing 102 and is operatively engaged to the drive system 120 by way of the at least one belt 124. The second shaft end 132 is rotatably coupled to the shaft mount.

Figure 6:
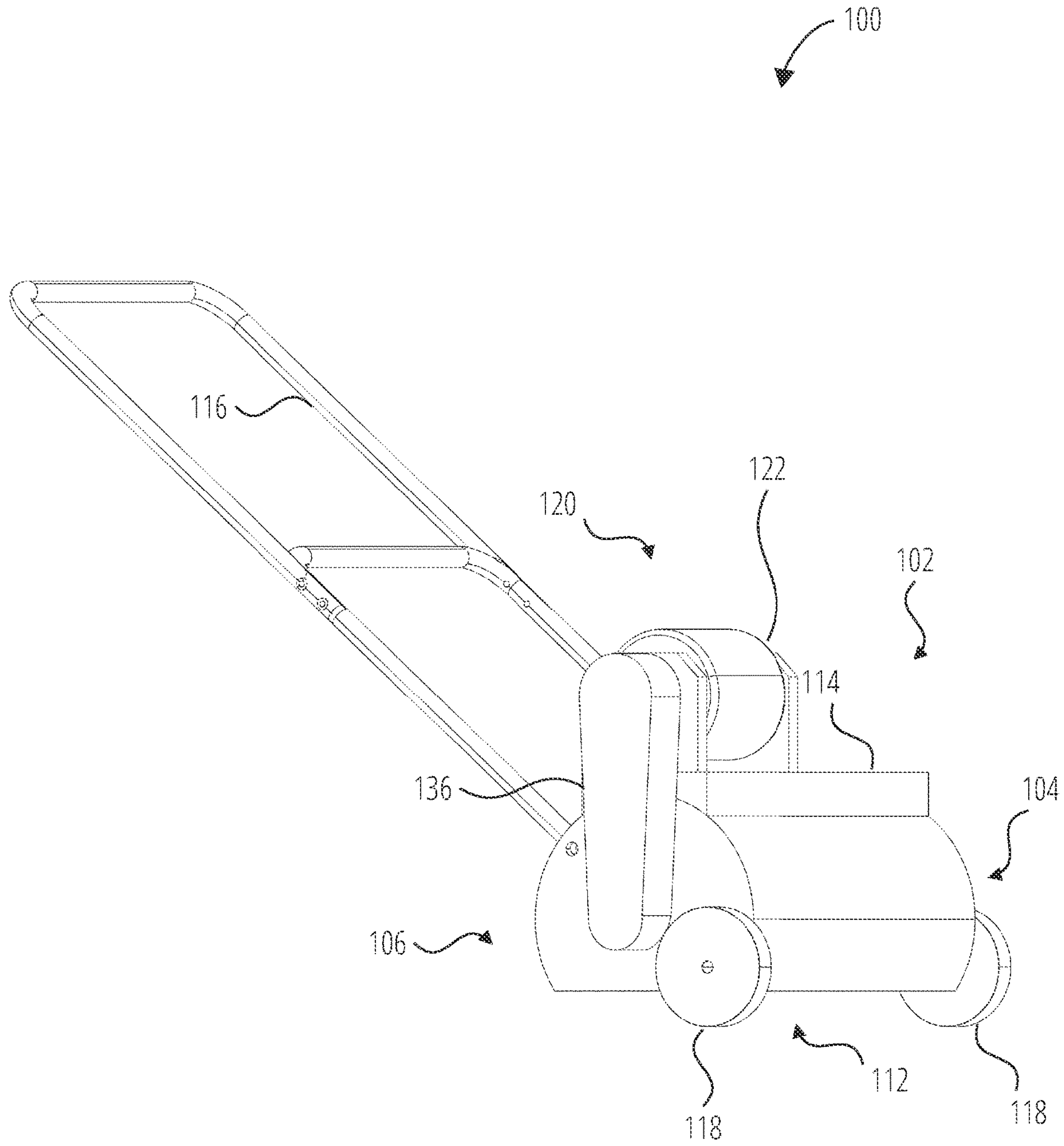
FIG. 6 illustrates a defoliation device 100 in accordance with one embodiment.

FIG. 6 illustrates a defoliation device 100 where the motor drive system 120 includes a shield 136 enclosing the at least one belt 124.

Figure 7:
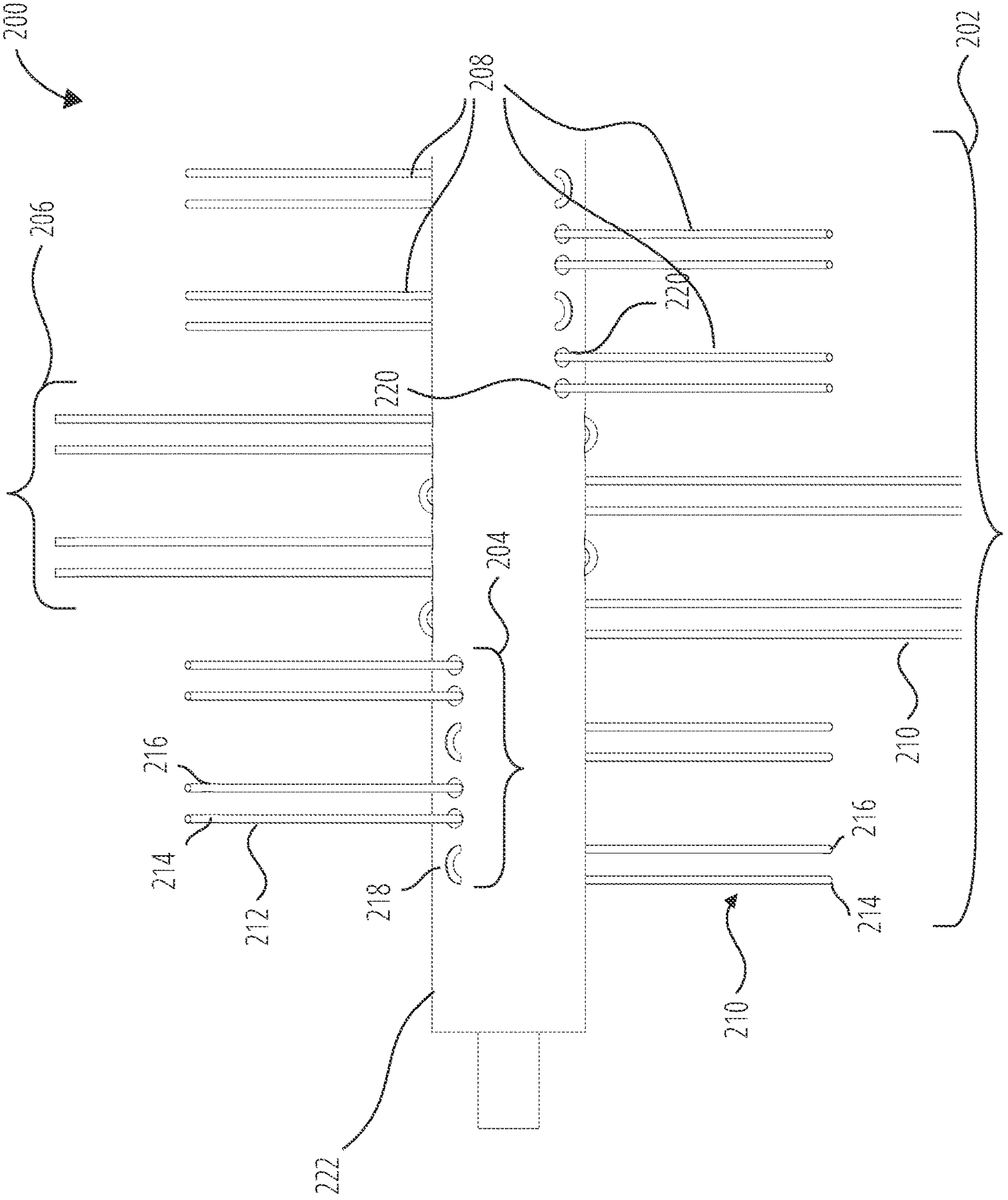
FIG. 7 illustrates a spindle assembly 200 in accordance with one embodiment.
Figure 8:
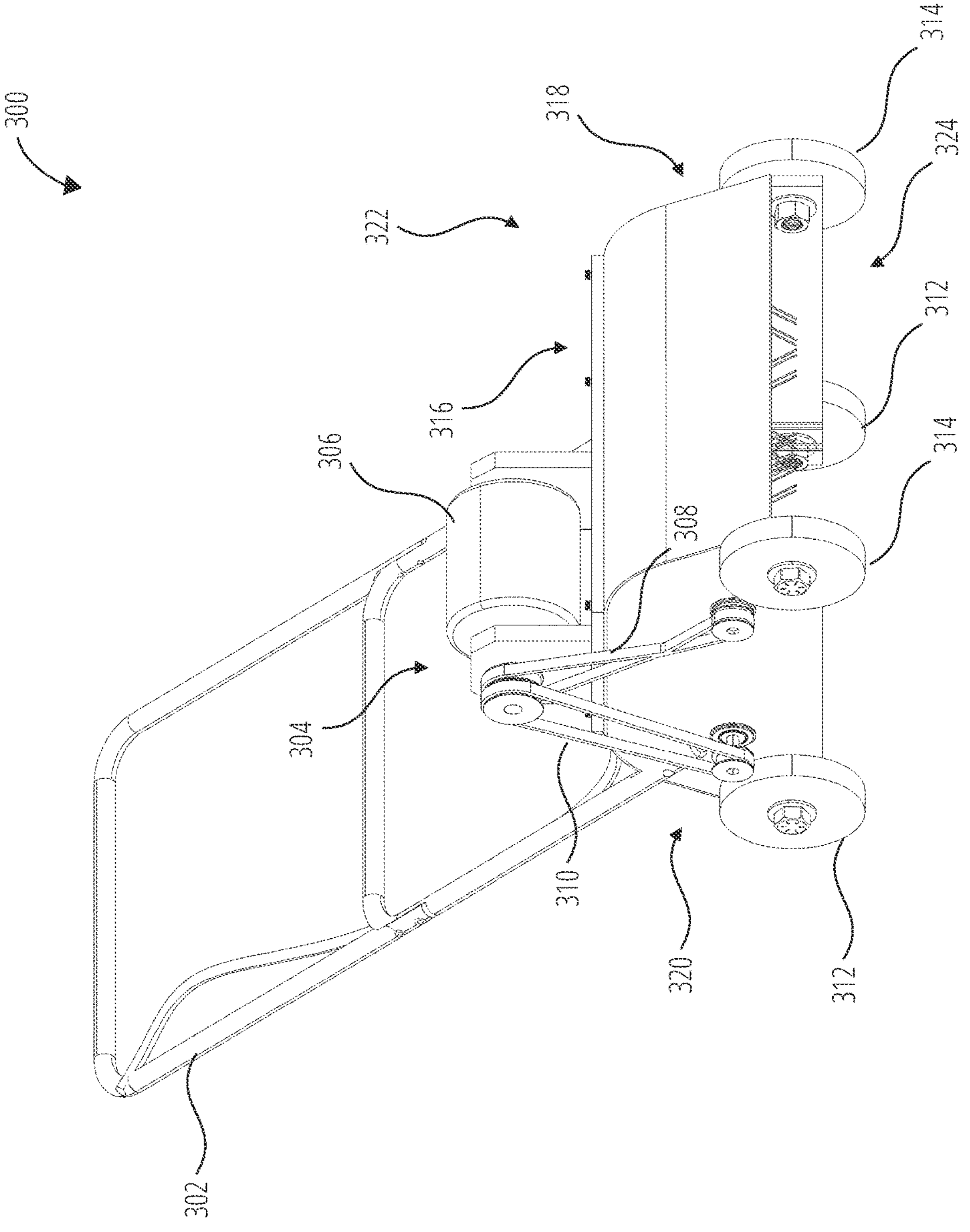
FIG. 8 illustrates an isometric view of a defoliation device 300 in accordance with one embodiment.
Figure 9:
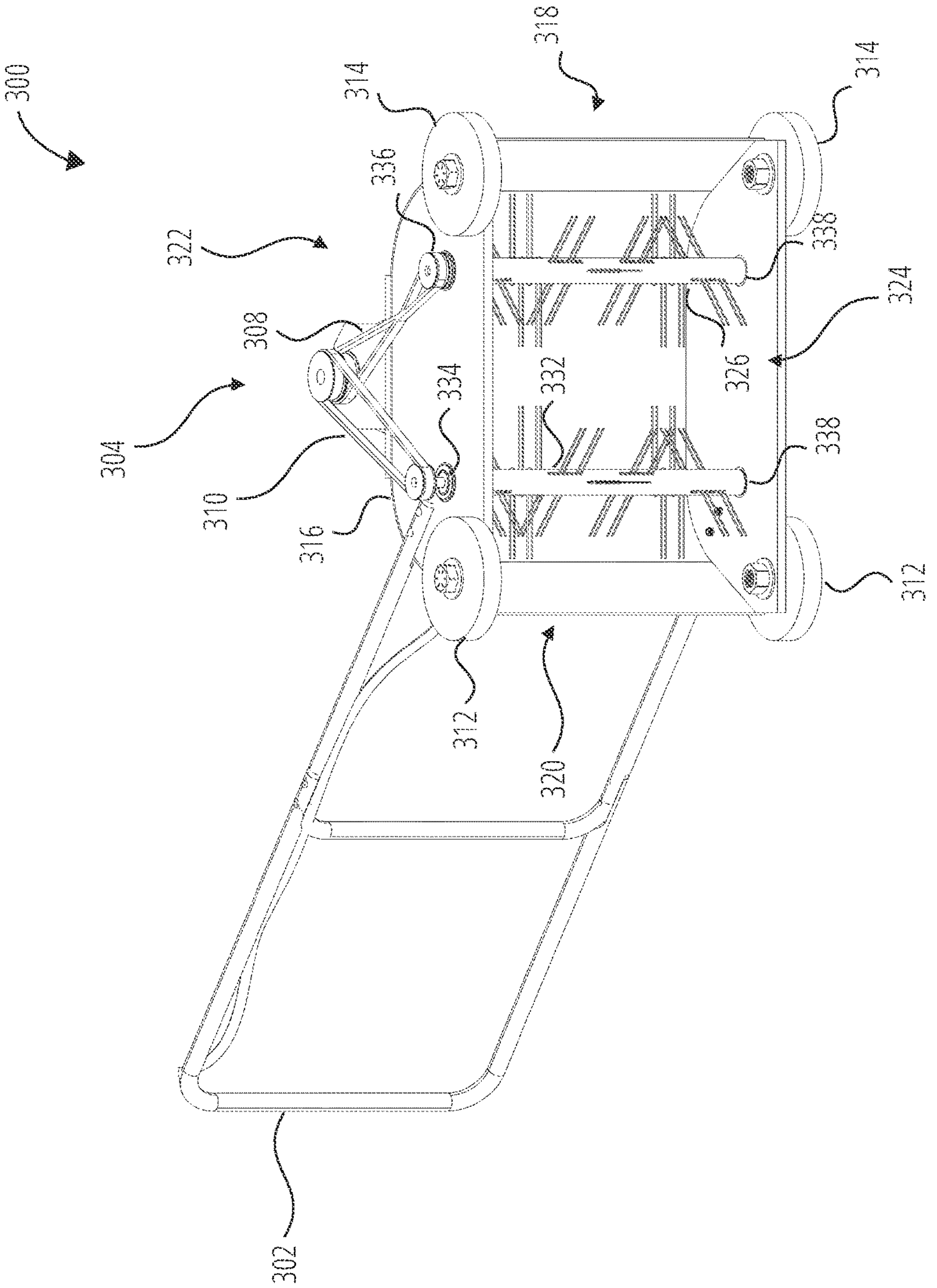
FIG. 9 illustrates a lower isometric view of the defoliation device 300 in accordance with one embodiment.
Figure 10:
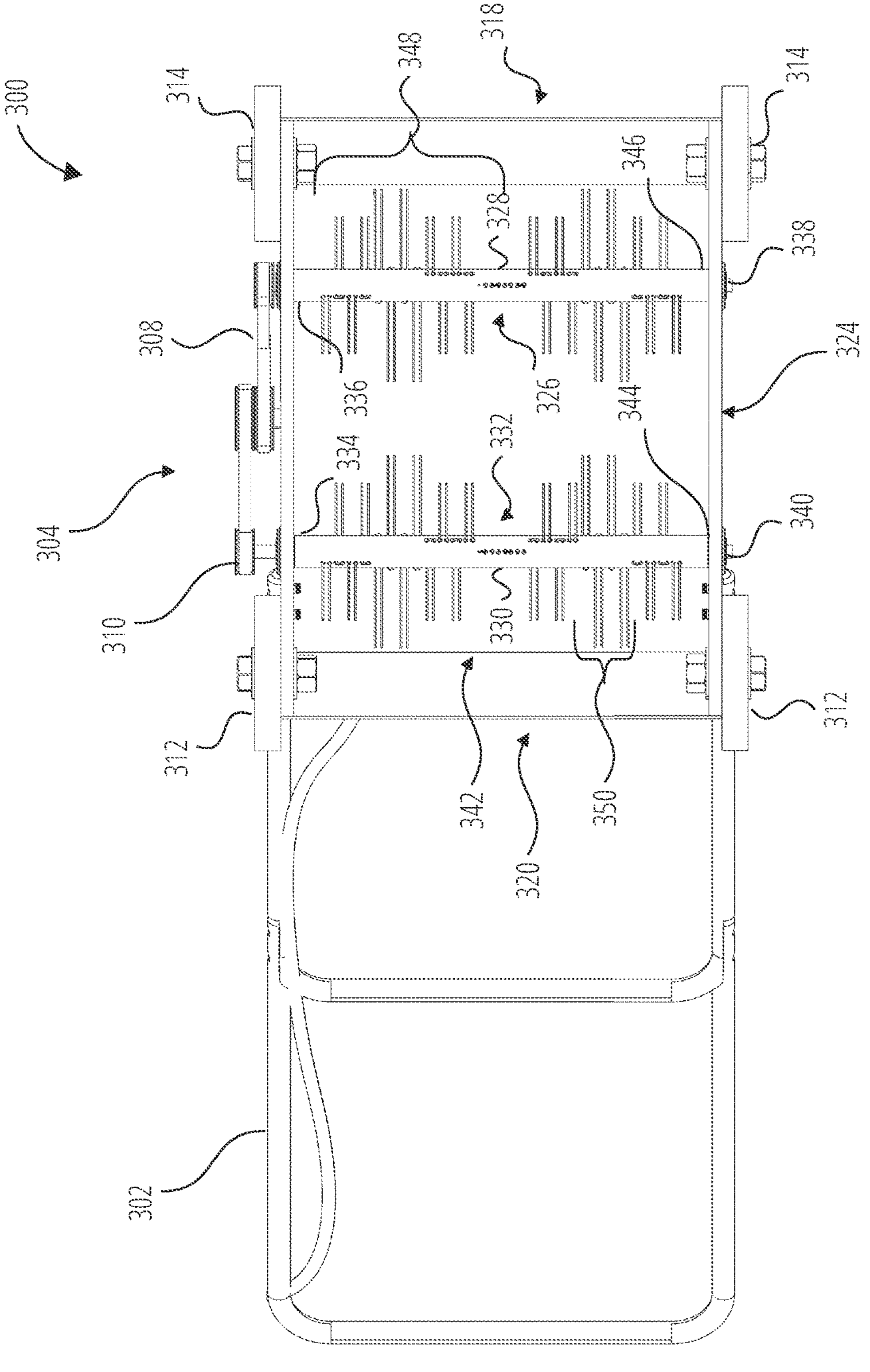
FIG. 10 illustrates a bottom view of the defoliation device 300 in accordance with one embodiment.
Figure 11:
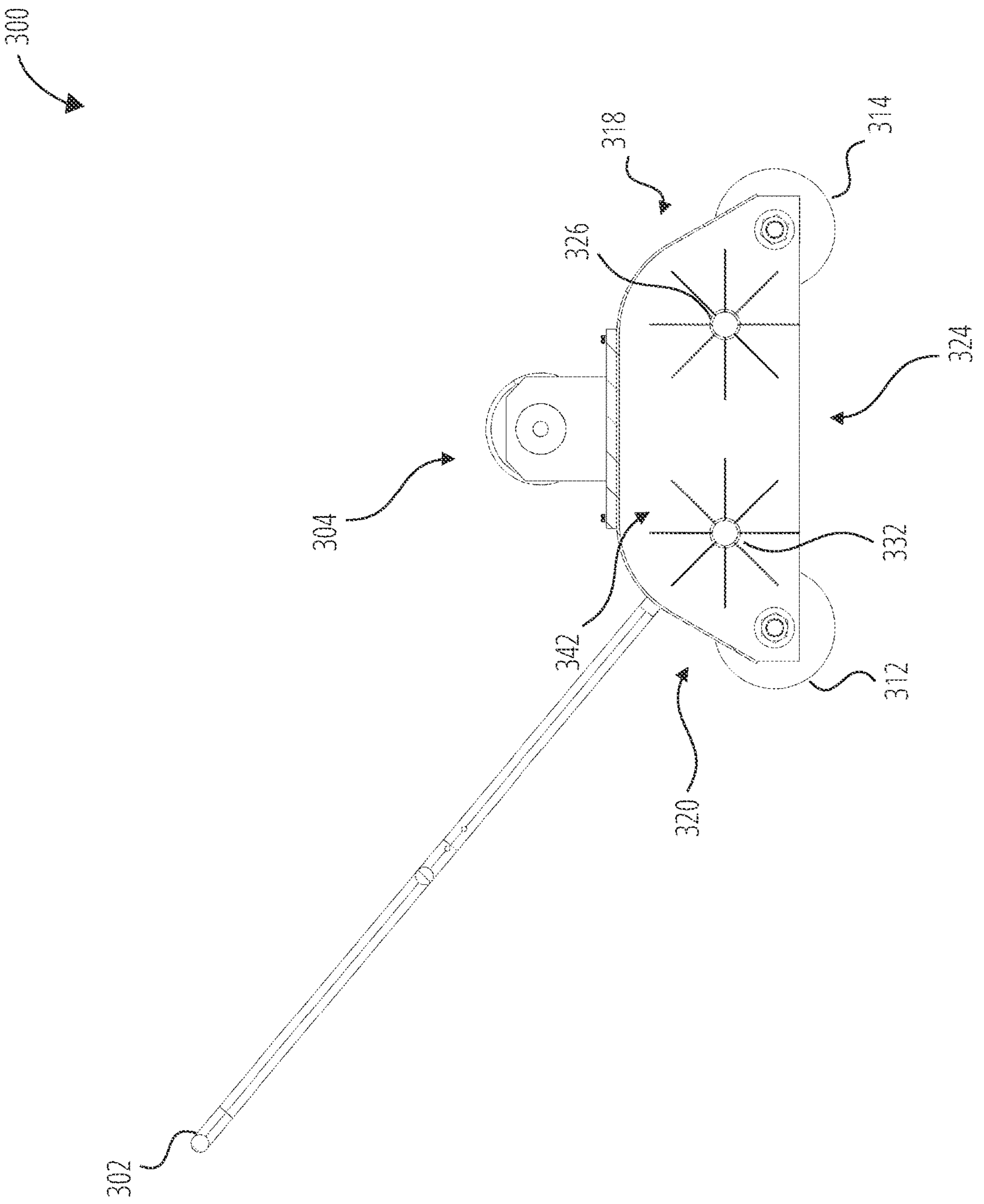
FIG. 11 illustrates a lateral sectional view of the defoliation device 300 in accordance with one embodiment.
Figure 12:
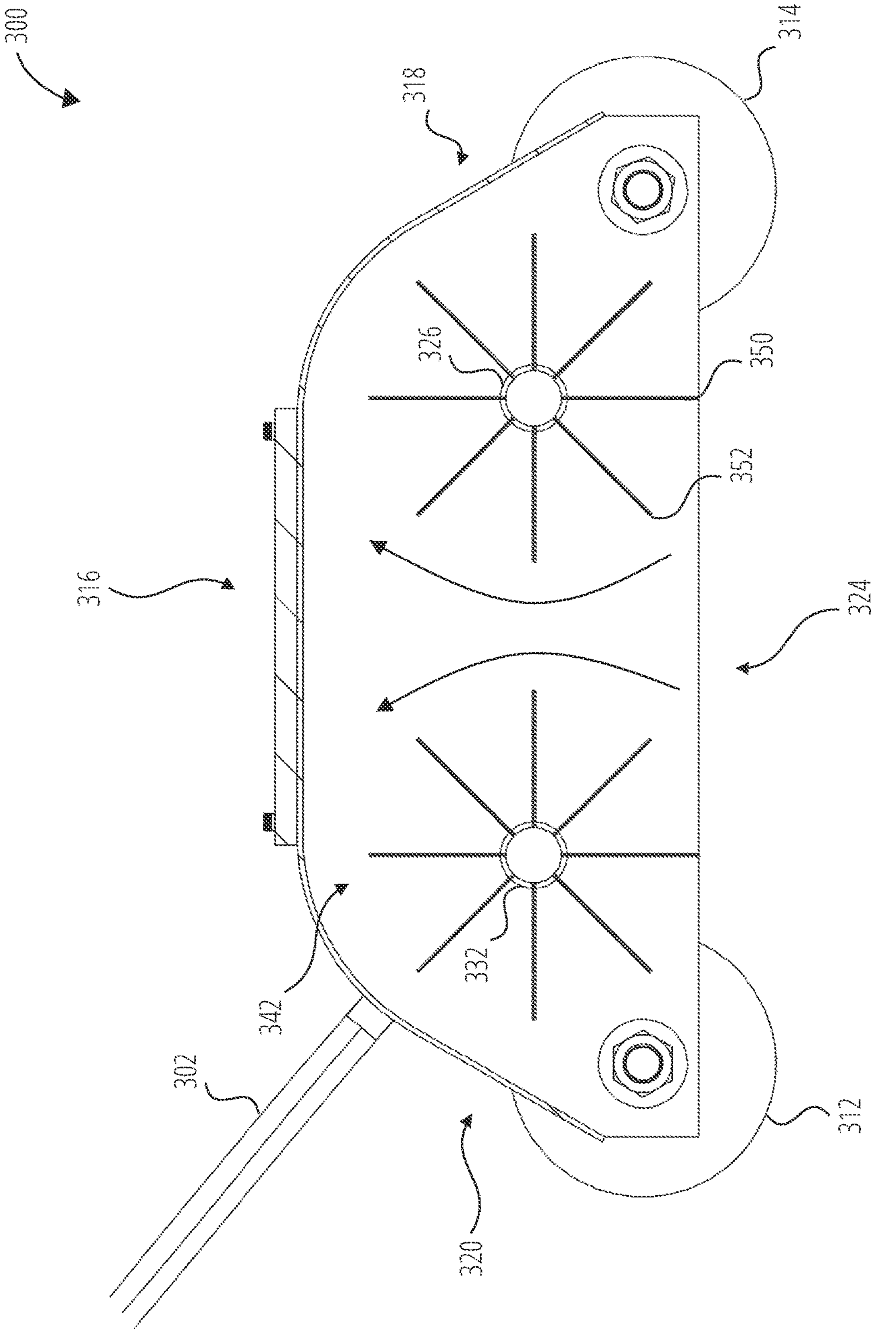
FIG. 12 illustrates a enhanced lateral sectional view of the defoliation device 300 in accordance with one embodiment.
Figure 13:
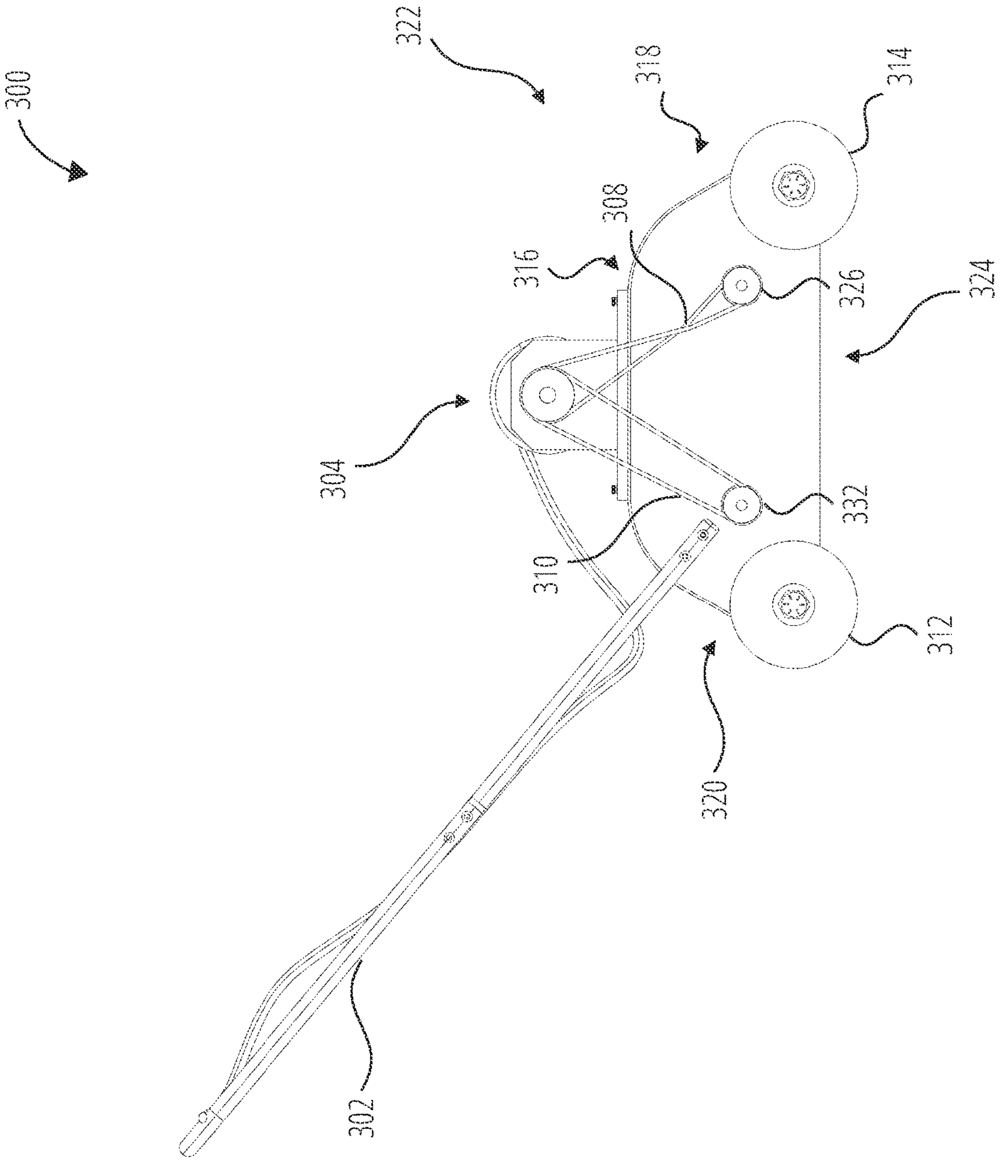
FIG. 13 illustrates a lateral view of the defoliation device 300 in accordance with one embodiment.
Figure 14:
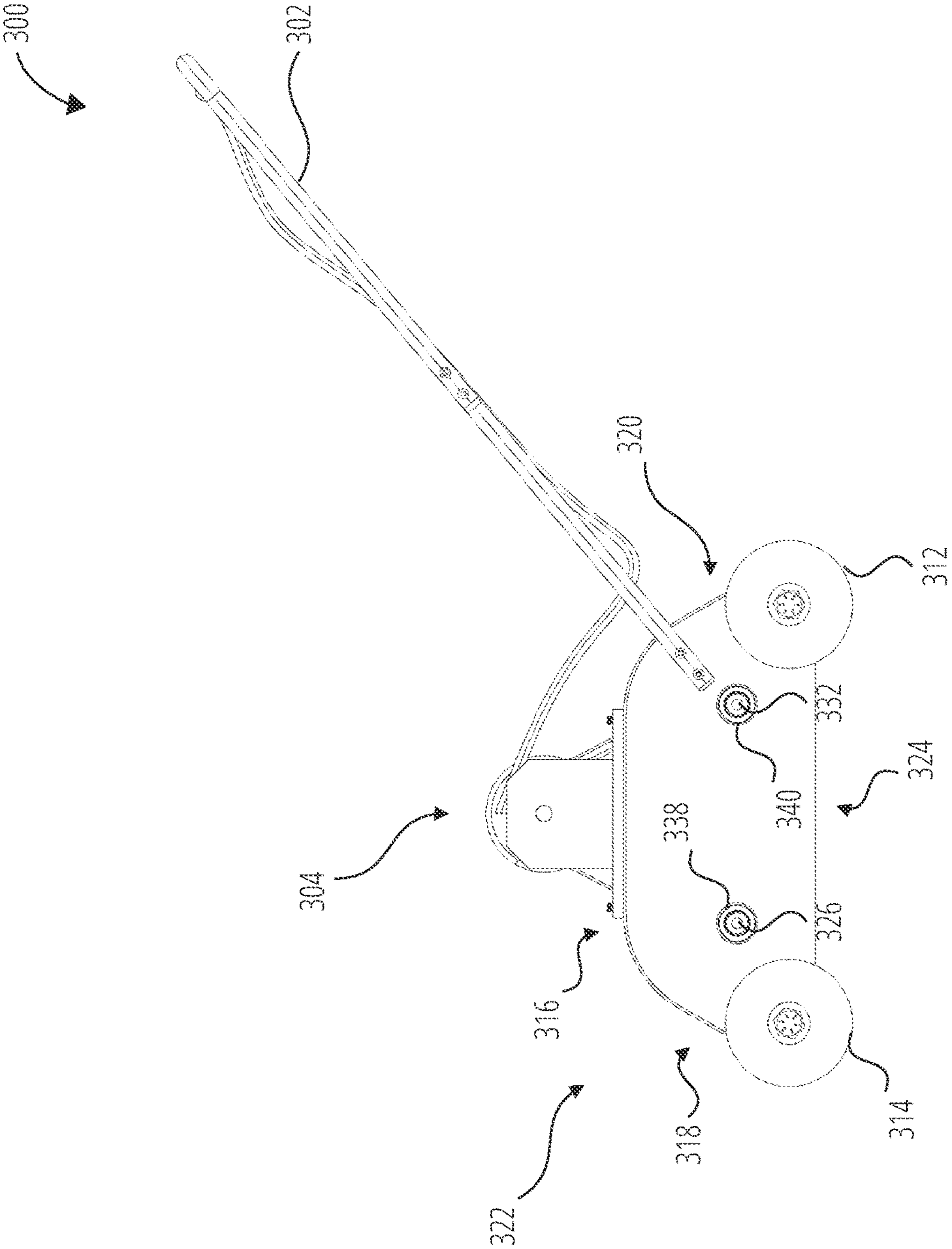
FIG. 14 illustrates a lateral view of the defoliation device 300 in accordance with one embodiment.

FIG. 7 illustrates a spindle assembly 200. The configuration of the spindle assembly 200 is utilized by the at least one spindle assembly 126 of the defoliation device 100 and a first spindle assembly 326 and second spindle assembly 332 of a defoliation device 300. The spindle assembly 200 comprises a plurality of trimmer line sets 202.

Each trimmer line set 204 of the plurality of trimmer line sets 202 is configured such that they are radially positioned along the length of the shaft 222. Each of the trimmer line sets 204 are configured such that they are positioned at a different radial position relative to an adjacent trimmer line set 206 along the shaft 222. Each of the trimmer line sets 204 comprises a plurality of looped trimmer lines 208. Each looped trimmer line 210 of the plurality of looped trimmer lines 208 comprises a first line end 214, a second line end 216, and a loop 218. Each of the looped trimmer lines 210 traverses the shaft 222 through a pair of mounting holes 220. The pair of mounting holes 220 travers the width of the shaft 222. When mounted, the first line end 214 and the second line end 216 traverse the pair of mounting holes 220 forming a loop 218 opposite the first line end 214 and the second line end 216 across the shaft 222.

Each of the looped trimmer lines 210 are configured such that they are oriented opposite to an adjacent looped trimmer line 212. The first line end 214 and the second line end 216 of the looped trimmer line 210 are configured such that they are opposite to the first line end 214 and the second line end 216 of the adjacent looped trimmer line 212.

The pair of mounting holes 220 are wider on the shaft 222 adjacent the first line end 214 and the second line end 216. The width of the pair of mounting holes 220 helps avoid a sharp edge engaging the looped trimmer line 210 when the defoliation device is in use, preventing additional stress on the trimmer lines that could lead to breaks.

FIG. 8-FIG. 15 illustrates an embodiment of a defoliation device 300. The defoliation device 300 comprises a housing 322, a push handle 302, a first set of wheels 314, a second set of wheels 312, a drive system 304, a first spindle assembly 326, and a second spindle assembly 332. The housing 322 comprises a front section 318, a rear section 320, a shaft mount 338, an interior compartment 342, a lower opening 324, and a top section 316. The push handle 302 is configured such that it is coupled to the rear section 320 of the housing 322 and may be configured pushing or pulling the defoliation device 300. The first set of wheels 314 may be configured such that they are rotatably coupled to the front section 318 near the lower opening 324 and the second set of wheels 312 may be configured such that they are rotatably coupled to the rear section 320 near the lower opening 324. The drive system 304 comprises a motor 306, a first belt 308, and a second belt 310, wherein the motor 306 is positioned on the top section 316 of the housing 322. The first spindle assembly 326 and the second spindle assembly 332, each comprise a shaft (shaft 328 and shaft 330, respectively) and a plurality of trimmer line sets 348. The shaft 328 of the first spindle assembly 326 comprises a first shaft end 336 and a second shaft end 346. The shaft 330 of the second spindle assembly 332 comprises a first shaft end 334 and a second shaft end 344. The first spindle assembly 326 and the second spindle assembly 332 may be configured such that they are rotatably positioned within the housing 322 between the front section 318 and the rear section 320, wherein the first spindle assembly 326 may be configured such that it is positioned adjacent to the front section 318 and the second spindle assembly 332 may be configured such that it is positioned adjacent to the rear section 320. The first shaft end (first shaft end 336 and first shaft end 334) traverses the housing 322 and are operatively engaged to the drive system 304. The second shaft end (second shaft end 346 and second shaft end 344) are rotatably coupled to the shaft mount (shaft mount 338 and shaft mount 340, respectively). The first spindle assembly 326 may be configured such that it is operatively engaged to the first belt 308 and the second spindle assembly 332 may be configured such that it is operatively engaged to the second belt 310. Each trimmer line set 350 of the plurality of trimmer line sets 348 may be configured such that they are radially positioned along the length of the shaft, wherein each of the trimmer line sets 350 may be configured such that it is at a different radial position relative to an adjacent trimmer line set 352 along the shaft. The plurality of trimmer line sets 348 of the first spindle assembly 326 rotates from the lower opening 324, towards the rear section 320 and then towards the top section 316 of the housing 322 and where the plurality of trimmer line sets 348 of the second spindle assembly 332 rotate from the lower opening 324, towards the front section 318, and then towards the top section 316.

Figure 15:
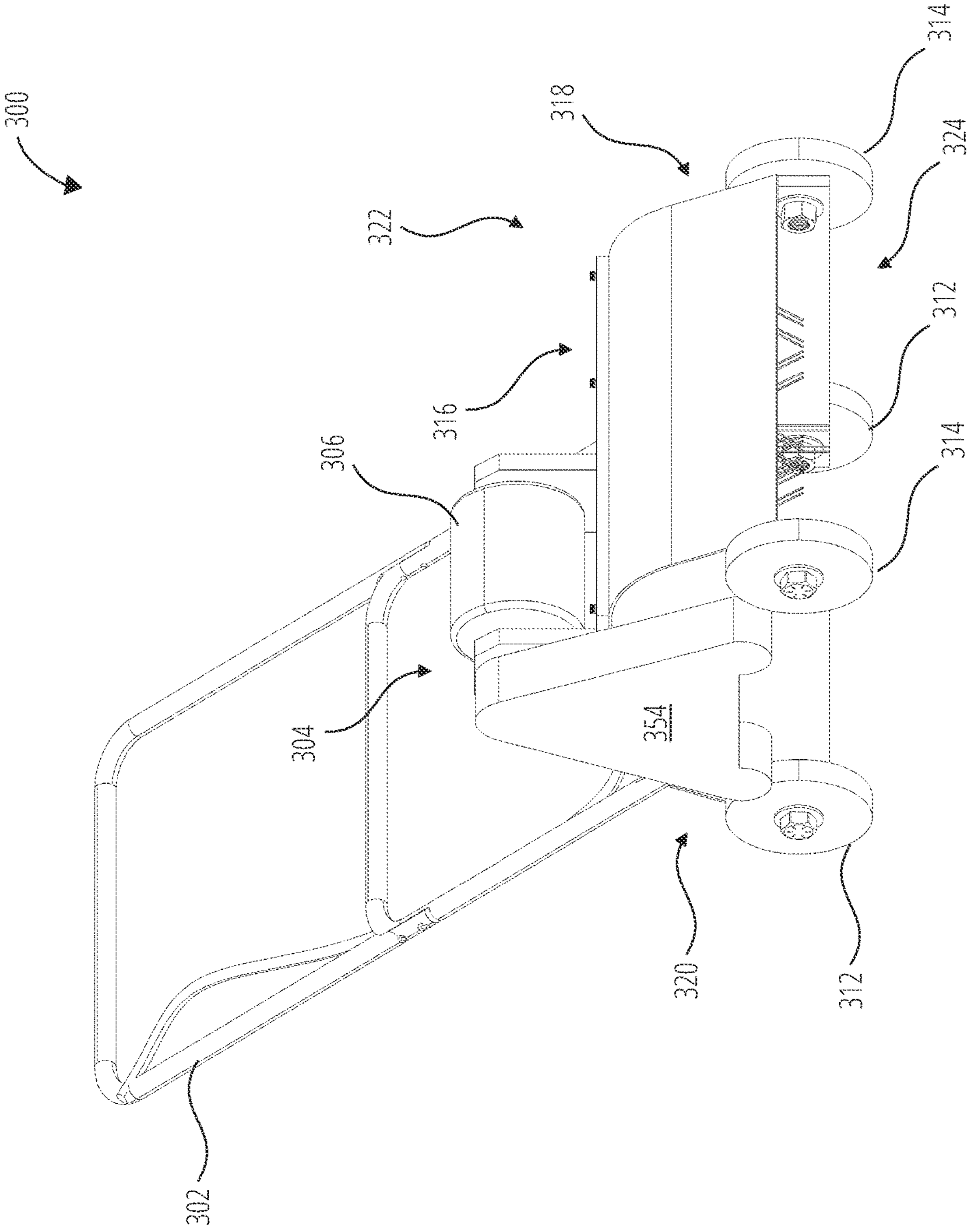
FIG. 15 illustrates the defoliation device 300 in accordance with one embodiment.

FIG. 15 illustrates a defoliation device 300 where the drive system 304 comprises a shield 354 covering the first belt 308 and the second belt 310.

What is claimed is:

1. A defoliation device comprises:

a housing comprising a front section, a rear section, a shaft mount, an interior compartment, a lower opening, and a top section;

a push handle coupled to the rear section of the housing;

at least one set of wheels being rotatably coupled to the housing adjacent to the lower opening;

a drive system comprising a motor and at least one belt, wherein the motor is positioned on the top section of the housing;

at least one spindle assembly comprising a shaft and a plurality of trimmer line sets, wherein the shaft comprises a first shaft end and a second shaft end;

the at least one spindle assembly being rotatably positioned within the interior compartment between the front section and the rear section;

the first shaft end traverses the housing and is operatively engaged to the drive system by way of the at least one belt;

the second shaft end is rotatably coupled to the shaft mount;

each trimmer line set of the plurality of trimmer line sets being radially positioned along the length of the shaft, wherein each of the trimmer line sets being at a different radial position relative to an adjacent trimmer line set along the shaft;

each of the trimmer line sets comprises a plurality of looped trimmer lines wherein each looped trimmer line comprises a first line end, a second line end, and a loop; and each of the looped trimmer lines traverses the shaft through a pair of mounting holes, wherein the first line end and the second line end traverses the pair of mounting holes forming a loop opposite the first line end and the second line end across the shaft, wherein the pair of mounting holes are wider on the shaft adjacent the first line end and the second line end.

2. The defoliation device of claim 1 further comprises:

the at least one spindle assembly comprises a first spindle assembly and a second spindle assembly;

the drive system comprises a first belt and a second belt;

the at least one set of wheels comprises a first set of wheels and a second set of wheels, wherein the first set of wheels being rotatably coupled to the front section near the lower opening and the second set of wheels being rotatably coupled to the rear section near the lower opening;

the first spindle assembly and the second spindle assembly being rotatably positioned within the housing between the front section and the rear section, wherein the first spindle assembly being positioned adjacent to the front section and the second spindle assembly being positioned adjacent to the rear section; and the first spindle assembly being operatively engaged to the first belt and the second spindle assembly being operatively engaged to the second belt.

3. The defoliation device of claim 2, wherein the plurality of trimmer line sets of the first spindle assembly rotates from the lower opening, towards the rear section, and then towards the top section of the housing and where the plurality of trimmer line sets of the second spindle assembly rotate from the lower opening, towards the front section, and then towards the top section.

4. The defoliation device of claim 2, wherein the first spindle assembly being rotatably driven opposite the second spindle assembly, by way of the first belt and the second belt, respectively.

5. The defoliation device of claim 1, wherein the at least one belt is enclosed by a shield.

6. The defoliation device of claim 1, wherein the motor is electrically powered.

7. The defoliation device of claim 1, wherein the plurality of trimmer line sets of the at least one spindle assembly rotates from the lower opening, towards the front section and then towards the top section of the housing.

8. A defoliation device comprises:

a housing comprising a front section, a rear section, a shaft mount, an interior compartment, a lower opening, and a top section;

a push handle coupled to the rear section of the housing;

at least one set of wheels being rotatably coupled to the housing adjacent to the lower opening;

a drive system comprising a motor and at least one belt, wherein the motor is positioned on the top section of the housing;

at least one spindle assembly comprising a shaft and a plurality of trimmer line sets, wherein the shaft comprises a first shaft end and a second shaft end;

the at least one spindle assembly being rotatably positioned within the interior compartment between the front section and the rear section;

the first shaft end traverses the housing and is operatively engaged to the drive system by way of the at least one belt;

the second shaft end is rotatably coupled to the shaft mount;

each trimmer line set of the plurality of trimmer line sets being radially positioned along the length of the shaft, wherein each of the trimmer line sets being at a different radial position relative to an adjacent trimmer line set along the shaft;

each of the trimmer line sets comprises a plurality of looped trimmer lines wherein each looped trimmer line comprises a first line end, a second line end, and a loop;

each of the looped trimmer lines traverses the shaft through a pair of mounting holes, wherein the first line end and the second line end traverses the pair of mounting holes forming a loop opposite the first line end and the second line end across the shaft, wherein the pair of mounting holes are wider on the shaft adjacent the first line end and the second line end; and each of the looped trimmer lines being oriented opposite to an adjacent looped trimmer line, wherein the first line end and the second line end of the looped trimmer line being opposite to the first line end and the second line end of the adjacent looped trimmer line.

9. The defoliation device of claim 8 further comprises:

the at least one spindle assembly comprises a first spindle assembly and a second spindle assembly;

the drive system comprises a first belt and a second belt;

the at least one set of wheels comprises a first set of wheels and a second set of wheels, wherein the first set of wheels being rotatably coupled to the front section near the lower opening and the second set of wheels being rotatably coupled to the rear section near the lower opening;

the first spindle assembly and the second spindle assembly being rotatably positioned within the housing between the front section and the rear section, wherein the first spindle assembly being positioned adjacent to the front section and the second spindle assembly being positioned adjacent to the rear section; and the first spindle assembly being operatively engaged to the first belt and the second spindle assembly being operatively engaged to the second belt.

10. The defoliation device of claim 9, wherein the first spindle assembly being rotatably driven opposite the second spindle assembly, by way of the first belt and the second belt, respectively.

11. The defoliation device of claim 8, wherein the at least one belt is enclosed by a shield.

12. The defoliation device of claim 8, wherein the motor is electrically powered.

13. A defoliation device comprises:

a housing comprising a front section, a rear section, a shaft mount, an interior compartment, a lower opening, and a top section;

a push handle coupled to the rear section of the housing;

a first set of wheels and a second set of wheels, wherein the first set of wheels being rotatably coupled to the front section near the lower opening and the second set of wheels being rotatably coupled to the rear section near the lower opening;

a drive system comprising a motor, a first belt, and a second belt, wherein the motor is positioned on the top section of the housing;

a first spindle assembly and a second spindle assembly, each comprising a shaft and a plurality of trimmer line sets, wherein the shaft comprises a first shaft end and a second shaft end;

the first spindle assembly and the second spindle assembly being rotatably positioned within the housing between the front section and the rear section, wherein the first spindle assembly being positioned adjacent to the front section and the second spindle assembly being positioned adjacent to the rear section;

the first shaft end traverses the housing and is operatively engaged to the drive system;

the second shaft end is rotatably coupled to the shaft mount;

the first spindle assembly being operatively engaged to the first belt and the second spindle assembly being operatively engaged to the second belt;

each trimmer line set of the plurality of trimmer line sets being radially positioned along the length of the shaft, wherein each of the trimmer line sets being at a different radial position relative to an adjacent trimmer line set along the shaft;

each of the trimmer line sets comprises a plurality of looped trimmer lines wherein each looped trimmer line comprises a first line end, a second line end, and a loop;

each of the looped trimmer lines traverses the shaft through a pair of mounting holes, wherein the first line end and the second line end traverses the pair of mounting holes forming a loop opposite the first line end and the second line end across the shaft, wherein the pair of mounting holes are wider on the shaft adjacent the first line end and the second line end;

each of the looped trimmer lines being oriented opposite to an adjacent looped trimmer line, wherein the first line end and the second line end of the looped trimmer line being opposite to the first line end and the second line end of the adjacent looped trimmer line; and the plurality of trimmer line sets of the first spindle assembly rotates from the lower opening, towards the rear section, and then towards the top section of the housing and where the plurality of trimmer line sets of the second spindle assembly rotate from the lower opening, towards the front section, and then towards the top section.

* * * * *